United States Patent
Knobbe et al.

(10) Patent No.: US 6,709,707 B2
(45) Date of Patent: Mar. 23, 2004

(54) REMOVAL OF ORMOSIL FILMS FROM METAL SUBSTRATES

(75) Inventors: Edward T. Knobbe, Stillwater, OK (US); Olga Kachurina, Stillwater, OK (US); Tammy L. Metroke, Stillwater, OK (US)

(73) Assignee: The Board of Regents For Oklahoma State University, Stillwater, OK (US)

( * ) Notice: Subject to any disclaimer, the term of this patent is extended or adjusted under 35 U.S.C. 154(b) by 0 days.

(21) Appl. No.: 10/238,028

(22) Filed: Sep. 9, 2002

(65) Prior Publication Data

US 2003/0049382 A1 Mar. 13, 2003

Related U.S. Application Data

(60) Provisional application No. 60/318,051, filed on Sep. 7, 2001.

(51) Int. Cl.[7] .............................. B05D 3/10; B05D 1/18; B05D 1/02; B05D 1/28
(52) U.S. Cl. ................ 427/343; 427/430.1; 427/443.2; 427/436; 427/421; 427/427; 427/428; 427/429; 134/2
(58) Field of Search .............................. 427/343, 430.1, 427/443.2, 436, 421, 427, 428, 429; 134/2

(56) References Cited

U.S. PATENT DOCUMENTS 4,126,483 A   11/1978   Donakowski et al. .......... 134/3
4,853,093 A * 8/1989   Brenk et al. ................. 205/214

FOREIGN PATENT DOCUMENTS

DE   36 00 415 A1   7/1987   ........... C25D/5/44
JP   11-158646 A *  6/1999   ........... C23C/22/00

OTHER PUBLICATIONS

Database WPI, Section Ch, Week 198218, Derwent Publications Ltd., London, GB; AN 1982–36513E, XP002225515 & JP 57 053574 A (Otsuka Kagaku Yakuhin KK), Mar. 30, 1982, Abstract.

* cited by examiner

Primary Examiner—Michael Barr
(74) Attorney, Agent, or Firm—Fellers, Snider, Blankenship, Bailey & Tippens, P.C.

(57) ABSTRACT

A process for chemical removal of organically-modified silicate (Ormosil) coatings from aluminum alloy substrates without degradation of the underlying metal. An Ormosil film is treated with a zincate solution. The zincate solution dissolves the Ormosil film and deposits a thin, easily-removed layer of zinc onto the aluminum alloy surface, which prevents base-activated dissolution of the underlying metal. The zinc layer may be removed using dilute phosphoric acid, leaving the surface of the aluminum alloy intact. Consequently, the sol-gel coating may be removed while the integrity of the aluminum alloy substrate is maintained.

14 Claims, 4 Drawing Sheets

Removal of Ormosil coating from aluminum alloy surface using various zincate concentrations. The dark area represents a thin zinc layer on the aluminum alloy.

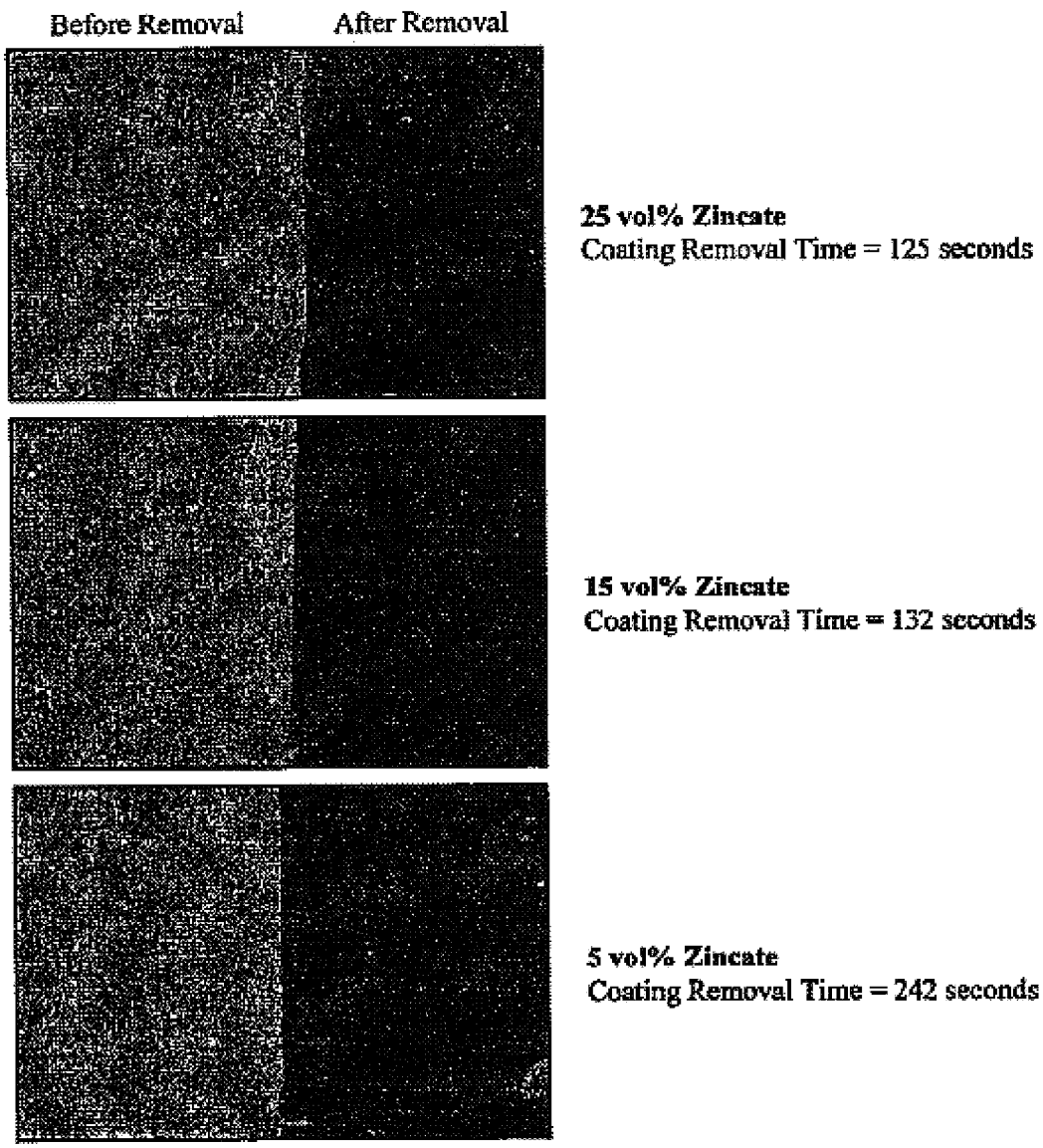
Figure 1: Removal of Ormosil coating from aluminum alloy surface using various zincate concentrations. The dark area represents a thin zinc layer on the aluminum alloy.

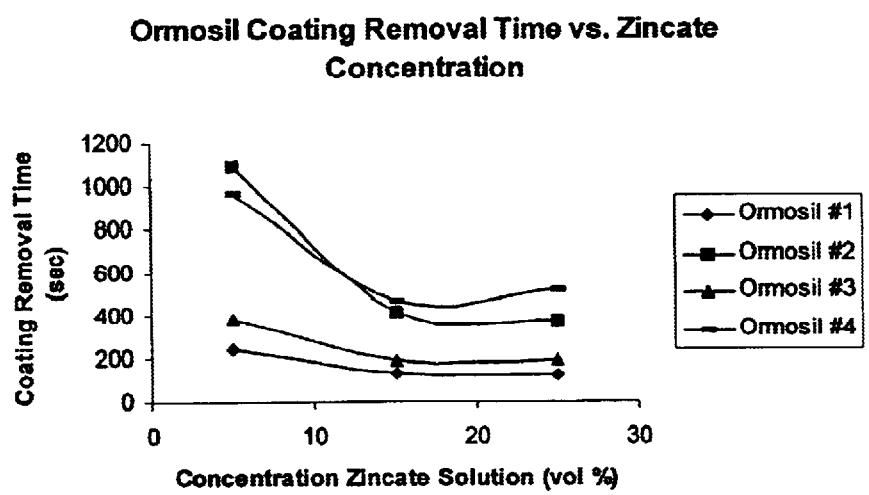
Figure 2: Coating removal behavior as a function of zincate concentration for four Ormosil compositions.

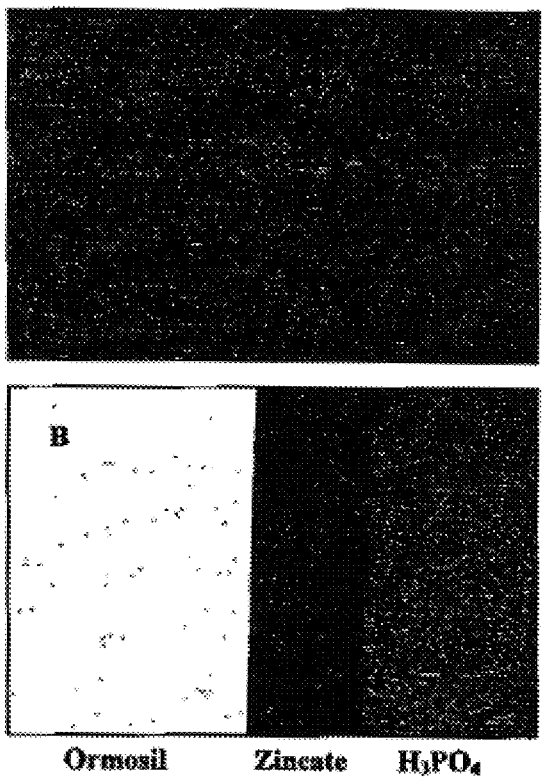
Figure 3: Coating removal using zincate leaves a thin layer of zinc on the aluminum alloy surface. Subsequent zinc removal using dilute phosphoric acid restores the aluminum alloy surface. Photo A shows bare aluminum alloy as a comparison. Coating removal conditions for photo B are 3 minute immersion in 15 vol% zincate followed by a 4 minute immersion in 1 vol% $H_3PO_4$.

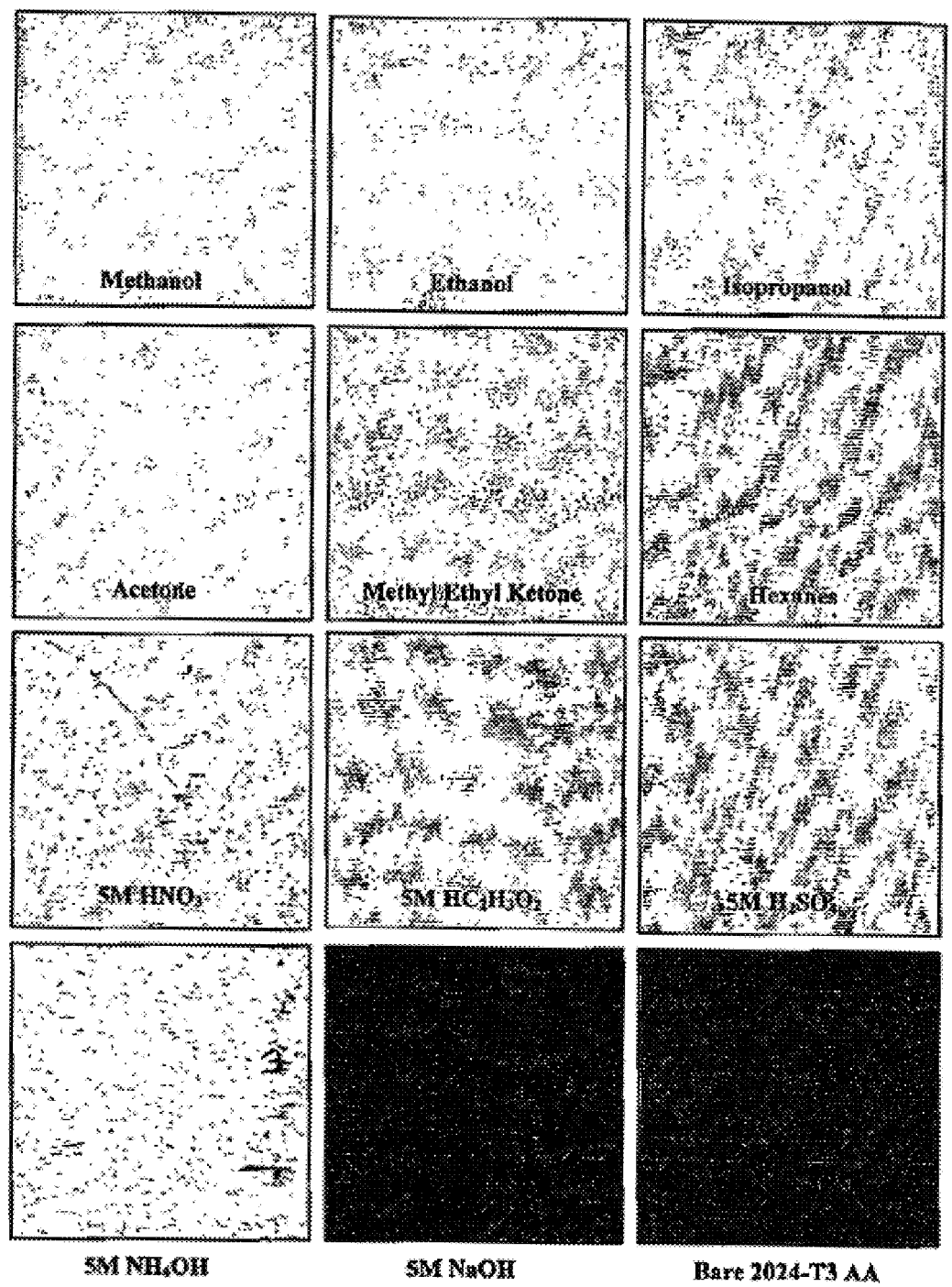
Figure 4: Ormosil-coated 2024-T3 aluminum alloy test coupons after 30 minute immersion in various solvents.

REMOVAL OF ORMOSIL FILMS FROM METAL SUBSTRATES

CROSS REFERENCE TO RELATED APPLICATION

This application claims the benefit of copending provisional application Ser. No. 60/318,051 filed Sep. 7, 2001, which application is incorporated herein by reference.

BACKGROUND OF THE INVENTION

1. Field of the Invention

This invention is in the field of removal of corrosion resistant, sol-gel derived, hybrid organic-inorganic coatings with application, among other things, in the aerospace industry.

2. Background

Organically modified silicate (Ormosil) coatings have been applied to various substrates and investigated for a diverse range of applications including enhancement of mechanical, thermal, optical, corrosion resistance and electrical properties of the underlying materials. Recent studies have shown that Ormosil films provide good corrosion protection for aluminum alloys as they form a dense, mechanically-stable, chemically-inert barrier layer on the metal surface. Ormosil coatings are of interest for aerospace applications due to their potential to replace hexavalent chromium conversion coatings as the corrosion inhibiting pretreatment.

For optimum corrosion protection, aircraft paint systems are removed and reapplied at 5–7 year intervals using abrasives or solvents. The former often results in damage to the metal substrate; the latter involves utilization of hazardous chemicals, such as methylene chloride. Implications of these difficulties associated with conventional coating removal techniques have prompted research for alternative cleaning methods such as coating pyrolysis, atmospheric-pressure pulsed-corona plasma, TEA-$CO_2$ laser ablation, and UV laser irradiation. The high adhesion and chemical inertness of Ormosil coatings make their removal from the underlying metal substrate difficult using common paint or coating stripping techniques. For these reasons, it is desirable that a simple, non-toxic coating removal process for Ormosil coatings be developed.

It is commonly known that strongly basic solutions can be used to dissolve sol-gel derived materials. These solutions may also be used to dissolve sol-gel coatings on aluminum alloy substrates; however, these reagents may partially dissolve the underlying aluminum metal, especially at high pH values.

It is thus an object of the present invention to provide a simple, non-toxic method of removing Ormosil coatings without harming the underlying substrate material.

SUMMARY OF THE INVENTION

A process is provided for chemical removal of organically-modified silicate (Ormosil) coatings from aluminum alloy substrates without degradation of the underlying metal. Contact with a zincate solution, which is commonly used as a pretreatment in electroless or electroplated nickel deposition on aluminum alloys, dissolves the Ormosil film and deposits a thin, easily-removed layer of zinc onto the aluminum alloy surface, preventing base-activated dissolution of the underlying metal. If desired, the zinc layer may be removed using dilute phosphoric acid, leaving the surface of the aluminum alloy intact. In this manner, removal of the sol-gel coating is achieved while simultaneously maintaining the integrity of the aluminum alloy substrate.

It is believed that the invention described herein is the first demonstrated example of removing an Ormosil film from metal substrates using basic zincate solutions.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

FIG. 1 exemplifies the removal of a representative Ormosil coating from an aluminum alloy surface induced by immersion in various zincate solutions.

FIG. 2 graphically illustrates coating removal behavior as a function of zincate concentration for four Ormosil compositions.

FIG. 3 exemplifies the removal of residual zinc layers by immersion in dilute phosphoric acid.

FIG. 4 shows comparative results of coating removal using various common organic solvents, acids and bases.

DETAILED DESCRIPTION OF THE PREFERRED EMBODIMENT

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

A basic zincate solution is applied using any conventional application method, including dip, spray, or roller-brush methods, for various times onto sol-gel coated aluminum alloys in order to promote Ormosil coating degradation and removal. A thin layer of zinc remains on the aluminum alloy surface, providing cathodic protection of the underlying metal as corrosion potentials for aluminum and zinc are −0.79 and −1.03 V, respectively[1]. If desired, the zinc layer remaining on the aluminum alloy surface may be removed using a dilute phosphoric acid solution, which is a component of the aluminum surface treatment commonly referred to as "skin brightener."[2]

[1] Values given are in 3% NaCl solution and referenced to a saturated calomel electrode (SCE). Suzuki, I., *Corrosion-Resistant Coatings Technology*, Marcel Dekker, Inc., New York, N.Y., (1989) pg. 28.
[2] Aluminum skin brightener may be obtained from Milanco, Inc., 635-F Pressley Rd., Charlotte, N.C., 28217.

The present invention will be further understood by reference to the following non-limiting example.

EXAMPLE

Preparation of Ormosil Film

A conventional sol-gel coating prepared from the acid catalyzed hydrolysis of an alkoxide and organically-modified silanes may be spray, spin, or dip-coated onto the aluminum alloy substrate. The Ormosil coating should be allowed to cure at room temperature prior to coating removal.

Preparation of the Zincate Solution

Commercially-available zincate solution, prepared according to manufacturer's instructions, may be used. A suitable zincate solution may be obtained from Caswell, 4336 Route 31, Palmyra, N.Y. 14522. In this example, the initial zincate concentrate content according to Caswell specifications was 65 wt. % sodium hydroxide, 2 wt. % sodium gluconate and <10 wt. % zinc oxide. However, ranges of approximately 50–75% wt. % NaOH and 5–20 wt % ZnO are also suitable for use in the invention. The concentrated solution may be diluted to give a final zincate concentration of 5–25 vol %. For purposes of this example, a 25 vol % zincate solution was prepared by adding 25 v/v % concentrated zincate solution to 75 v/v % of deionized water.

Application

Zincate solution may be applied onto the Ormosil coated aluminum alloy substrate using dip or spray coating techniques. Immersion or spray coating times may range from 120–1800 seconds depending on the Ormosil coating composition and the zincate concentration.

Assessment of Ormosil Coating Removal Using Zincate Solutions

In this example, four Ormosil coatings were investigated. Ormosil #1 was prepared from the commonly known constituents of vinyltrimethoxysilane (VTMOS), (3-trimethoxysilyl)propylmethacrylate (MEMO), and tetraethylorthosilicate (TEOS). Ormosil #2 consisted of Ormosil #1 plus mercaptopropyltrimethoxysilane (MTMO) as a room temperature curing agent. Ormosil #3 consisted of Ormosil #1 plus 5 wt. % sub-micron to micron-sized $TiO_2$ (titania) particles. Ormosil #4 consisted of Ormosil #2 plus 5 wt. % sub-micron to micron-sized $TiO_2$ (titania) particles.

FIG. 1 shows coating removal induced by immersion in various zincate solutions for a representative Ormosil. Each of the zincate solutions was found to remove the Ormosil coating from the aluminum alloy, leaving a thin zinc film (the dark area in FIG. 1) which prevents any further dissolution of the aluminum alloy by the basic zincate solution.

For each of the Ormosil coatings, increasing zincate solution concentration from 5 to 15 vol %, lead to a decrease in coating removal times as shown in FIG. 2. Above 15 vol %, coating removal times were found to increase slightly, allowing selection of optimal zincate solution concentration. Coating removal times were found to depend on Ormosil composition, though for each of the four coatings, the trend in removal times was similar.

Removal of Zinc Layer Using Phosphoric Acid

Residual zinc layers were found to be removed by immersion in dilute phosphoric acid as shown in FIG. 3, thus restoring the aluminum alloy surface. Photo A shows bare aluminum alloy as a comparison. Coating removal conditions for photo B were 3 minutes in 15 vol % zincate followed by a 4 minute immersion in 1 vol % $H_3PO_4$. The optimum phosphoric acid concentration was found to between 1–2 vol %. Higher acid concentrations were found to slow zinc layer removal.

Comparison of Zincate Coating Removal to other Common Organic Solvents, Acids, and Bases FIG. 4 shows the results of coating removal using various common organic solvents, acids, and bases. Polar organic solvents, such as alcohols and ketones were found to attack the investigated Ormosil coating, though none were successful in removing the coating from the aluminum alloy. Hexanes, a non-polar organic solvent, was not found to affect the integrity of the Ormosil. Acidic solutions were not found to remove the Ormosil film, though $HNO_3$ was found to cause cracking. Basic solutions were found to degrade the Ormosil coating. 5M $NH_4OH$ was found to promote Ormosil film flaking as the coating dried after immersion. 5M NaOH was found to remove the Ormosil coating.

Comparison of the zincate solution to that of the other solvents investigated indicates that the zincate solution is more effective for Ormosil coating removal than the other solvents except for 5M NaOH. It is known that NaOH can be used to dissolve silica-based materials. However, for coating removal applications, use of zincate is more desirable than NaOH, as NaOH is known to promote dissolution of aluminum alloys.

In summary, zincate solutions may be used to dissolve Ormosil coatings from aluminum alloys. In this process, after Ormosil removal a thin layer of zinc is deposited on the aluminum alloy substrate providing cathodic protection of the aluminum alloy. If desired, the zinc layer may be removed using dilute phosphoric acid, leaving the surface of the aluminum alloy intact.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A method of Ormosil coating removal from a metal substrate comprising the steps of:

applying a basic zincate solution to the Ormosil coating.

2. The method according to claim 1 wherein:

said step of applying a basic zincate solution comprises dissolving said

Ormosil coating and depositing a layer of zinc onto the metal substrate.

3. The method according to claim 2 further comprising:

applying phosphoric acid to remove said layer of zinc.

4. The method according to claim 1 wherein said step of applying comprises:

dipping the metal substrate into said basic zincate solution.

5. The method according to claim 4 wherein said step of dipping comprises:

submerging the metal substrate for between approximately 120 and 1800 seconds.

6. The method according to claim 1 wherein said step of applying comprises:

spraying the metal substrate with said basic zincate solution.

7. The method according to claim 6 wherein said step of spraying comprises:

spraying for between approximately 120 and 1800 seconds.

8. The method according to claim 1 wherein said step of applying comprises:

roller brushing the metal substrate with said basic zincate solution.

9. The method according to claim 1 wherein said basic zincate solution comprises:

between approximately 50 and 75 wt. % NaOH.

10. The method according to claim 1 wherein said basic zincate solution comprises:

between approximately 5 and 20 wt. % ZnO.

11. The method according to claim 1 wherein said basic zincate solution comprises:

approximately 65 wt. % sodium hydroxide, approximately 2 wt. % sodium gluconate and less than approximately 10 wt. % zinc oxide.

12. The method according to claim 1 wherein said basic zincate solution comprises:

a zincate concentration of approximately 5–25 vol %.

13. The method according to claim 1 wherein said basic zincate solution comprises:

an approximately 25 vol % zincate solution prepared by adding approximately 25 v/v % concentrated zincate solution to approximately 75 v/v % of deionized water.

14. The method according to claim 1 wherein the metal substrate is an aluminum alloy.

* * * * *